United States Patent [19]
Kim

[11] Patent Number: 6,163,627
[45] Date of Patent: Dec. 19, 2000

[54] METHOD AND APPARATUS FOR ENCODING A CONTOUR OF AN OBJECT

[75] Inventor: Jin-Hun Kim, Seoul, Rep. of Korea

[73] Assignee: Daewoo Electronics Co. Ltd., Rep. of Korea

[21] Appl. No.: 08/868,861

[22] Filed: Jun. 4, 1997

[30] Foreign Application Priority Data

Dec. 23, 1996 [KR] Rep. of Korea ..................... 96-70632

[51] Int. Cl.⁷ .................................................. G06K 9/36
[52] U.S. Cl. ............................................................ 382/241
[58] Field of Search .................................. 382/232, 233, 382/236, 238–243, 248, 250; 358/432–433; 348/382, 394–395, 400–404, 407–416, 420–421, 425, 430, 431, 699

[56] References Cited

U.S. PATENT DOCUMENTS

| | | | |
|---|---|---|---|
| 4,853,971 | 8/1989 | Nonura | 382/199 |
| 5,131,058 | 7/1992 | Ting et al. | 382/199 |
| 5,675,669 | 10/1997 | Kim | 382/242 |
| 5,764,808 | 6/1998 | O'Connell et al. | 382/243 |
| 5,774,595 | 6/1998 | Kim | 382/242 |
| 5,793,893 | 8/1998 | Kim | 382/242 |
| 5,838,829 | 11/1998 | Kim | 382/243 |
| 5,870,501 | 2/1999 | Kim | 382/242 |
| 5,881,183 | 3/1999 | Lee | 382/243 |

*Primary Examiner*—Jose L. Couso
*Attorney, Agent, or Firm*—Anderson Kill & Olick

[57] ABSTRACT

A method for encoding a video signal of a contour of an object, which is capable of reducing the amount of transmission data through selectively transforming the approximation errors, is disclosed. The method divides the contour into a multiplicity of contour segments, and approximates each of the contour segments by a line segment, thereby determining positions of vertices on the contour. Then, it calculates a set of errors between the contour segment and the line segment, wherein the set of errors is a difference between each contour segment and the line segment corresponding thereto, and then calculates a value for determining the difference between the contour segment and the line segment. Thereafter, the method encodes and generates the positions of the vertices on the contour and the set of errors if the calculated value for determining the difference between the contour segment and the line segment is larger than a threshold value TH. Alternatively, if the calculated value is smaller than the threshold value TH, the method encodes and generates only the positions of the vertices on the contour, thereby reducing the amount of transmission data.

17 Claims, 5 Drawing Sheets

METHOD AND APPARATUS FOR ENCODING A CONTOUR OF AN OBJECT

FIELD OF THE INVENTION

The present invention relates to a method and apparatus for encoding a video signal of a contour of an object; and, more particularly, to a method and apparatus capable of reducing the amount of data by adaptively encoding approximation errors.

BACKGROUND OF THE INVENTION

In digitally televised systems such as video-telephone, teleconference and high definition television systems, a large amount of digital data is needed to define each video frame signal since the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of data through the use of various data compression techniques, especially, in the case of such low bit-rate video signal encoders as video telephone and teleconference systems.

One of such techniques for encoding video signals for a low bit-rate encoding system is an object-oriented analysis-synthesis coding technique, wherein an input video image is divided into objects and three sets of parameters for defining the motions, the contours, and the pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although the method does not incur any loss in the contour information.

To overcome the drawback, there have been proposed several methods to encode the contour information such as a polygonal approximation and a B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error, resulting in an increased overall computational complexity of the video encoder.

One of the techniques introduced to ameliorate such problems associated with the coarse representation of the contour and the increased computational complexity in the above approximation approaches is a contour approximation technique employing a discrete sine transform(DST).

In an apparatus which adopts the contour approximation technique based on the polygonal approximation and the DST, as disclosed in a commonly owned copending application, U.S. Ser. No. 08/423,604, entitled "A CONTOUR APPROXIMATION APPARATUS FOR REPRESENTING A CONTOUR OF AN OBJECT", a number of vertex points are determined and the contour of the object is approximated through the use of a polygonal approximation for fitting the contour by line segments. And, N sample points on each line segment are selected, and an approximation error at each of the N sample points located on each line segment is sequentially calculated in order to obtain a set of approximation errors for each line segment. And each of the approximation errors represents the distance between the contour and the line segment at each of the N sample points. Thereafter, a set of DST coefficients is generated by performing a one-dimensional DST operation on each set of the approximation errors.

Even though it is possible to remedy the rough representation and computational complexity and reduce the volume of transmission data through the use of the DST-based contour approximation, it still remains desirable to further reduce the volume of transmission data in order to efficiently implement a low-bit rate codec system having, e.g., a 64 kb/s transmission channel bandwidth.

SUMMARY OF THE INVENTION

It is, therefore, a primary object of the present invention to provide an improved method and apparatus for encoding a video signal of a contour of an object, which is capable of reducing the amount of transmission data through selectively transforming the approximation errors.

In accordance with the present invention, there is provided a method for encoding a video signal of a contour of an object, comprising the steps of: dividing the contour into a multiplicity of contour segments, and approximating each contour segment by a line segment joining two end points of each contour segment, thereby determining positions of vertices on the contour; encoding the positions of the vertices on the contour; calculating a set of errors for each contour segment, wherein the set of errors represents a difference between each contour segment and the line segment corresponding thereto; coding the set of errors to provide a set of coded errors; estimating an approximation error between each contour segment and the line segment corresponding thereto; if the approximation error is larger than a threshold value TH, providing the set of coded errors and the set of encoded positions of the vertices on the contour as encoded data for the contour; and if the approximation error is smaller than or equal to the threshold value TH, providing the set of the encoded positions of the vertices on the contour as the encoded data for the contour.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1:
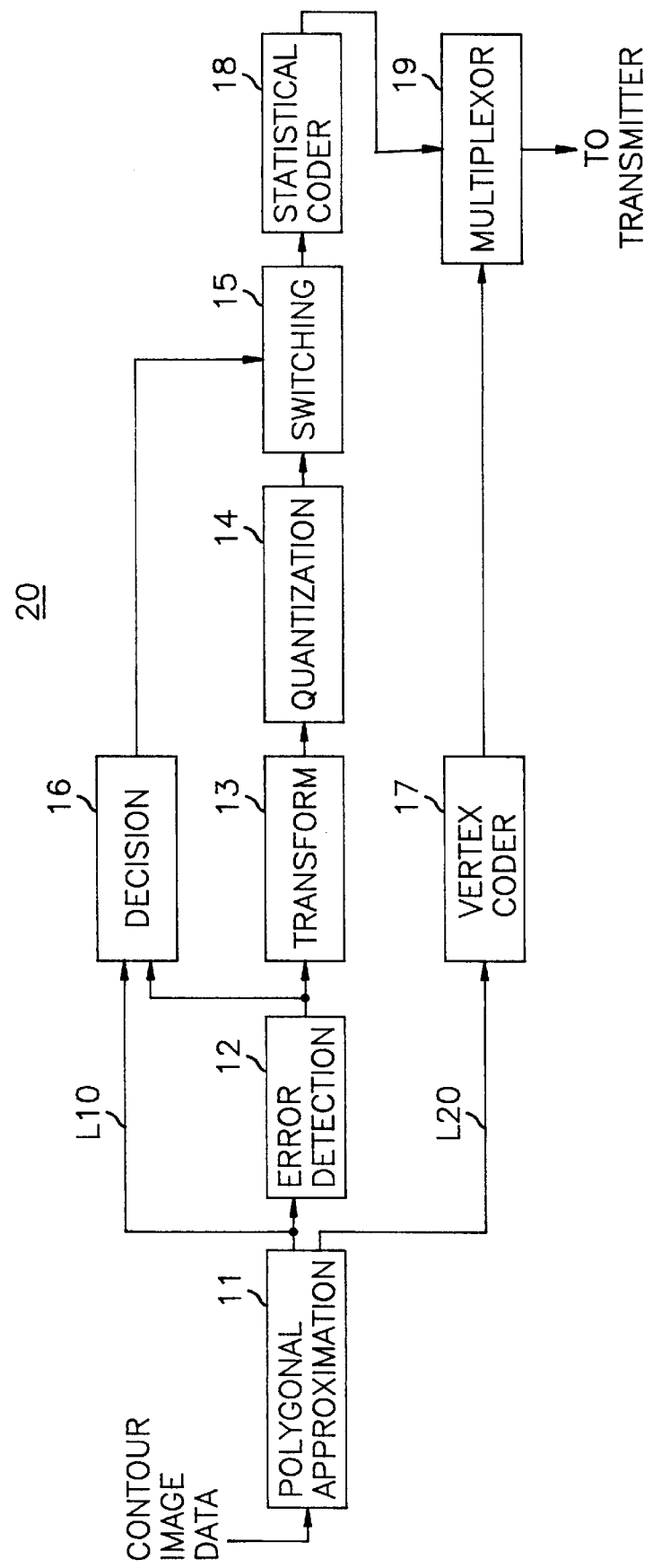
FIG. 1 shows a schematic block diagram of an apparatus for encoding a contour of an object in accordance with the present invention.

Referring to FIG. 1, there is provided a block diagram of a contour encoder 20 for encoding a video signal of a contour of an object in accordance with the preset invention.

Contour image data is inputted to a polygonal approximation block 11, the contour image data representing position information of contour pixels constituting the contour of the object.

At the polygonal approximation block 11, a plurality of vertices are determined on the contour through the use of the conventional polygonal approximation technique. By performing the polygonal approximation, the contour is divided into a multiplicity of contour segments. Each of the contour segments represents a portion of the contour made of two adjacent vertices along the contour and contour pixels disposed therebetween; and is approximated by a line segment joining the two adjacent vertices. The polygonal approximation block 11 provides contour segment data for each of the contour segments to an error detection block 12 and a decision block 16 via a line L10, and also provides vertex data to a vertex coder 17 via a line L20, wherein the contour segment data represents position information of contour pixels and vertices constituting a contour segment and the vertex data denotes position information of the vertices included in the contour segment.

Referring to FIGS. 2A to 2D, there is illustrated a polygonal approximation process to an exemplary contour 10.

As the contour 10 is of an open loop, two end points, e.g., A and B, are selected as starting vertices. On the other hand, if the contour to be approximated is of a closed loop, two farthest points on the contour are selected as the starting vertices. And then, the farthest point on the contour 10 from a line segment AB, e.g., C, is determined. If the distance $D_{max}$ from the point C to the line segment AB is greater than a predetermined threshold TH, the point C is selected as a vertex. This procedure is repeated until the $D_{max}$ for each line segment connecting two adjacent vertices along the contour 10 becomes equal to or smaller than the predetermined threshold TH.

Figure 2A:
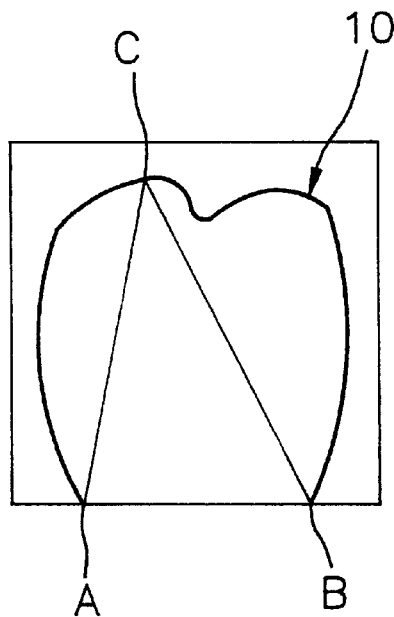
FIGS. 2A to 2D offer a polygonal approximation process.
Figure 2B:
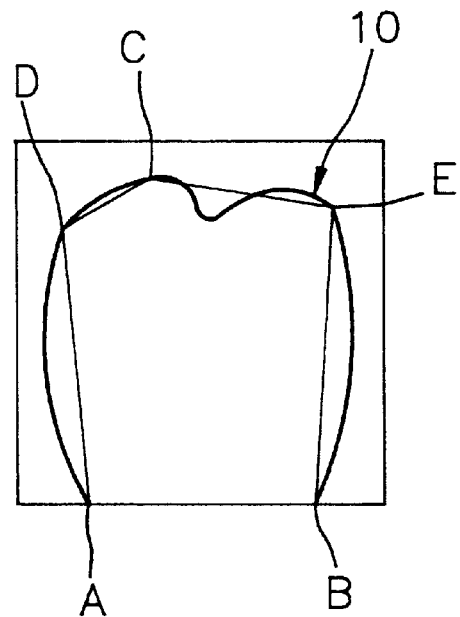
Figure 2C:
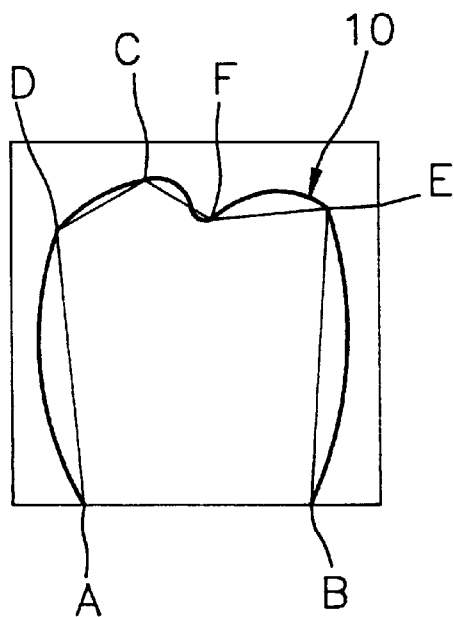
Figure 2D:
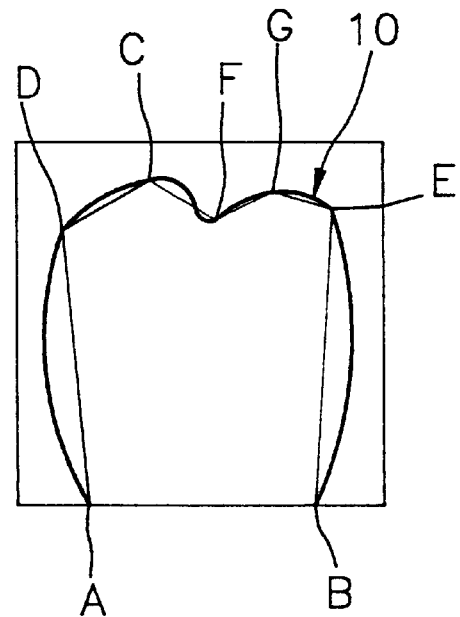

As a result of the above procedure, the vertices, e.g., A to G, the contour segments, e.g., curve AD to curve EB, and the line segments, e.g., AD to EB, are produced as shown in FIG. 2D.

The number of vertex points depends on the predetermined threshold TH. As can be seen from FIGS. 2A to 2D, the approximation of the contour 10 with line segments becomes more similar to the contour 10 as the predetermined threshold TH becomes smaller, at the expense of coding efficiency. Therefore the threshold TH is determined under the consideration of the amount of data to be transmitted.

Referring back to FIG. 1, at the vertex coder 17, the vertex data for the contour segments is encoded by using, e.g., the conventional octant-based vertex coding technique or an arithmetic coding technique. The encoded vertex data is then provided to a multiplexor 19.

The error detection block 12, responsive to the contour segment data for a contour segment, takes N sample points on the line segment; and calculates an error at each sample point, to thereby provide a set of errors for each contour segment to a transform block 13 and the decision block 16, N being a positive integer, wherein the sample points on the line segment are equi-distanced from each other in a preferred embodiment of the invention, and the set of errors represents a difference between each contour segment and the line segment corresponding thereto.

In accordance with the preferred embodiment of the invention, an error represents a displacement from a sample point to an intersection formed by the contour segment and a line drawn normal to the line segment from the sample point, the error including a distance between the sample point and the intersection and a sign indicating a relative position of the intersection with respect to the line segment.

Figure 3A:
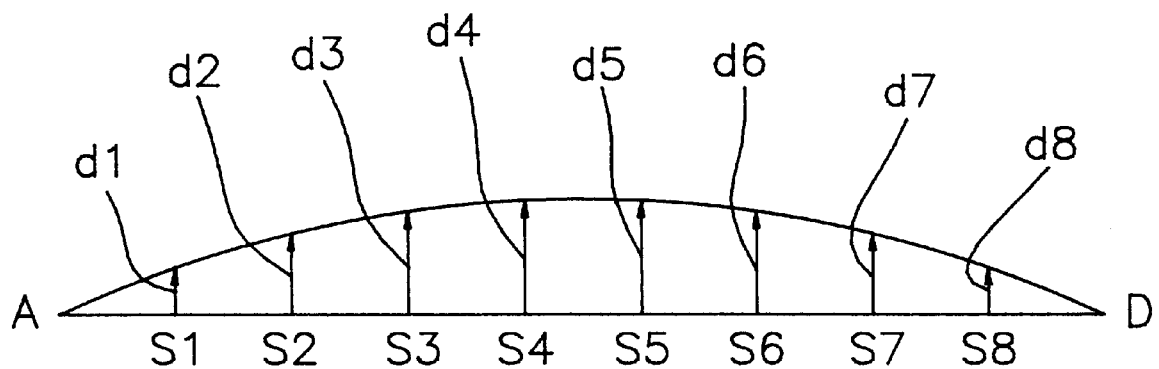
FIGS. 3A and 3B provide exemplary diagrams, each representing errors between a line segment joining two vertex points and its corresponding contour segment.
Figure 3B:
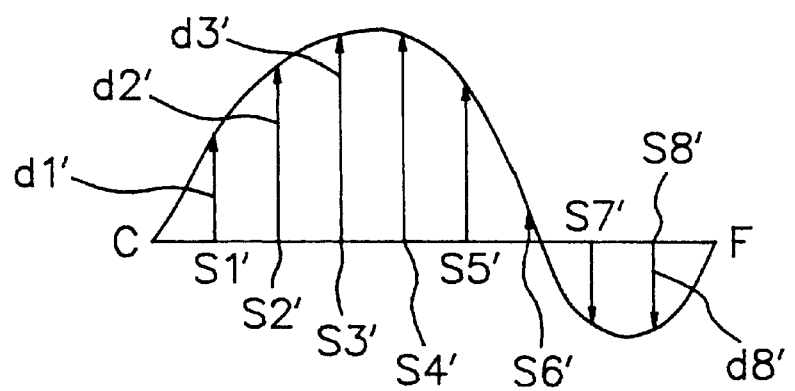

Referring to FIG. 3A or 3B, there is illustrated an exemplary diagram representing errors between the line segment AD or CF and its corresponding contour segment, wherein the displacement, e.g., d1 or d1' from a sample point S1 on the line segment AD or a sample point S1' on the line segment CF to its corresponding intersection on the contour segment represents the error at the sample point S1 or S1'; and the displacements d1 to d8 at the sample points S1 to S8 and d1' to d8' at the sample points S1' to S8' are the elements of a set of errors for the line segment AD and CF, respectively.

Referring back to FIG. 1, the transform block 13, which receives the set of errors for the contour segment, performs one-dimensional transform to the set of errors from the error detection block 12 by using a predetermined transform method, e.g., discrete sine transform(DST) or discrete cosine transform(DCT), to thereby produce a set of transform coefficients for each set of errors and provide same to a quantization block 14.

Consequently, the quantization block 14 quantizes the set of transform coefficients from the transform block 13 and provides a set of quantized transform coefficients corresponding thereto to a switching block 15.

At the decision block 16, an approximation error between each contour segment and a corresponding line segment thereof is estimated; and it is determined based on the magnitude of the estimated difference whether a set of errors for each contour segment is to be encoded and transmitted to a receiving end.

Referring to FIGS. 4A to 4E, there are presented exemplary diagrams setting forth various methods for determining the approximation error between a contour segment CS and a line segment LS in the decision block 16 shown in FIG. 1, respectively.

Figure 4A:
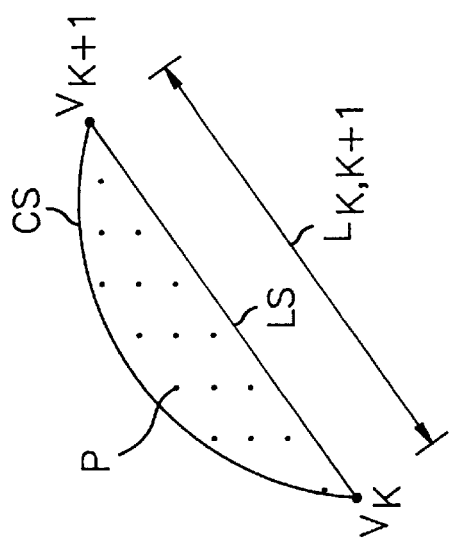
FIGS. 4A to 4E present exemplary diagrams setting forth methods for determining the difference between a contour segment and a line segment in accordance with the present invention.

In a preferred embodiment shown in FIG. 4A, the difference is defined by a length $L_{k,k+1}$ of the line segment LS joining two vertex points $V_k$, $V_{k+1}$, the length $L_{k,k+1}$ being calculated as follows:

$$L_{k,k+1} = \sqrt{(x_{k+1} - x_k)^2 + (y_{k+1} - y_k)^2}$$

or $$L_{k,k+1} = |x_{k+1} - x_k| + |y_{k+1} - y_k|$$

wherein $x_k$, $y_k$, $x_{k+1}$ and $y_{k+1}$ represent the coordinates of the two vertex points $V_k$, $V_{k+1}$, respectively.

Figure 4B:
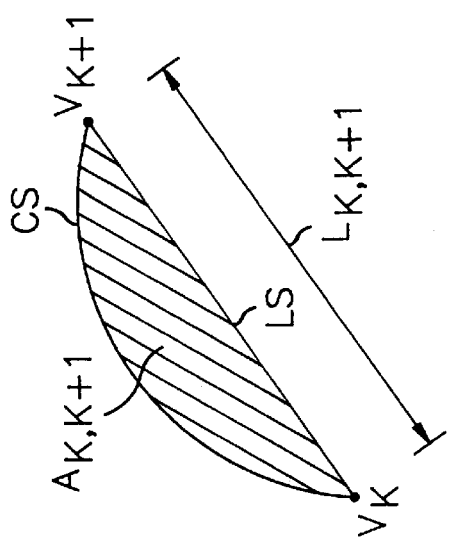

As shown in FIG. 4B, the approximation error may be defined as a value dividing an area $A_{k,k+1}$ confined by the line segment LS and its corresponding contour segment CS by the length $L_{k,k+1}$ of the line segment LS.

Figure 4C:
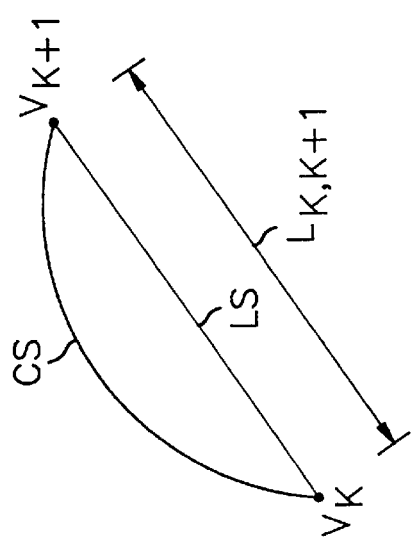

In another preferred embodiment of the invention shown in FIG. 4C, a value obtained the approximation error is defined by dividing the number of pixels P surrounded by the line segment LS joining the two vertex points $V_k$, $V_{k+1}$ and the contour segment CS by the length $L_{k,k+1}$.

Figure 4E:
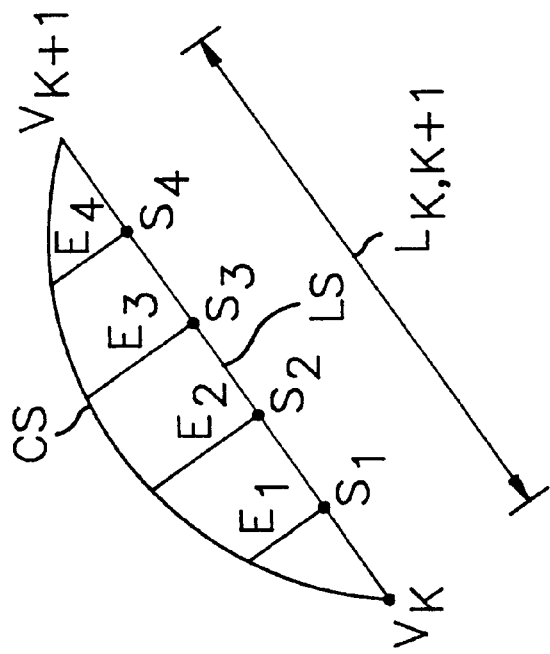
Figure 4D:
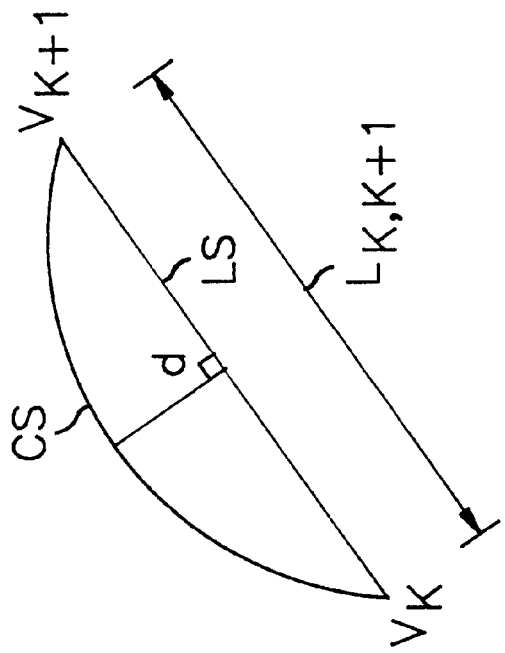

In FIG. 4D, the approximation is calculated by dividing a distance D from the line segment LS to the farthest point on the contour segment CS by the length $L_{k,k+1}$.

In FIG. 4E, the sum of the distances, e.g., $E_1$, $E_2$, $E_3$, $E_4$, between the contour segments and the N sample points, e.g., $S_1$, $S_2$, $S_3$, $S_4$, taken on the line segment LS divided by the length $L_{k,k+1}$ is defined as the approximation error.

Referring back to FIG. 1, the decision block 16 compares the approximation error obtained by one of the methods described with FIGS. 4A to 4E with a preset threshold TH'; and outputs to the switching block 15 a first selection signal if the approximation error is greater than TH' and a second selection signal if otherwise. The switching block 15 which receives the set of quantized transform coefficients from the quantization block 14 performs a switching operation according to a selection signal from the decision block 16. If the switching block 15 receives the first selection signal, it transfers the set of quantized transform coefficients to a statistical coder 18. Alternatively, if the switching block 15 receives the second selection signal, it intercepts the transfer of the set of quantized transform coefficients therethrough.

In case the set of quantized DST coefficients is transferred to the statistical coder 18 by the switching block 15, the statistical coder 18 encodes the set of quantized transform coefficients through the use of a conventional statistical coding scheme, e.g., VLC(variable length coding) technique, and then transmits the statistically coded data of the set of quantized transform coefficients to the multiplexor 19, which also receives the encoded vertex data from the vertex coder 17. The multiplexor 19 provides the statistically coded data and the encoded vertex data to a transmitter(not shown) for the transmission thereof.

As described above, in accordance with the present invention statistically coded data of a set of errors for s contour segment is adaptively transmitted depending on whether an estimated approximation error between the contour segment and its corresponding line segment is greater than the threshold TH'. If the approximation error is not greater than the threshold TH', representing that the approximation error is not considerable, only the vertices of the line segment are encoded and transmitted to a decoder of the receiving end; and the contour segment is approximately therein by the line segment. By carrying out the encoding of the contour, the amount of transmission data can be economized while maintaining the picture quality.

In another preferred embodiment of the invention, the contour encoder 20 of FIG. 1 can be constituted in such a way that the switching block 15 is positioned between the error detection block 12 and the transfer block 13. In such an instance, the transfer of the set of errors from the error detection block 12 to the transfer block 13 is controlled by a selection signal from the decision block 16.

While the present invention has been described with respect to certain preferred embodiments only, other modifications and variations may be made without departing from the scope of the present invention as set forth in the following claims.

What is claimed is:

1. A method for encoding a video signal of a contour of an object, comprising the steps of:

dividing the contour into a multiplicity of contour segments, and approximating each contour segment by a line segment joining two end points of said each contour segment, thereby determining positions of vertices on the contour;

encoding the positions of the vertices on the contour;

calculating a set of errors for said each contour segment, wherein the set of errors represents a difference between said each contour segment and the line segment corresponding thereto;

coding the set of errors to provide a set of coded errors;

estimating an approximation error between said each contour segment and the line segment corresponding thereto;

if the approximation error is larger than a threshold value TH, providing the set of coded errors and the set of encoded positions of the vertices on the contour as encoded data for the contour; and if the approximation error is smaller than or equal to the threshold value TH, providing the set of the encoded positions of the vertices on the contour as encoded data for the contour.

2. The method of claim 1, wherein the approximation error is a length of the line segment.

3. The method of claim 1, wherein the approximation error is a value obtained by dividing an area between said each contour segment and the line segment corresponding thereto by a length of the line segment.

4. The method of claim 1, wherein the approximation error is a value obtained by dividing the number of pixels surrounded by the line segment and said each contour segment by a length of the line segment.

5. The method of claim 1, wherein the approximation error is a value obtained by dividing a distance from the line segment to the farthest point on said each contour segment by a length of the line segment.

6. The method of claim 1, wherein the approximation error is a value obtained by dividing the sum of distances from a sample point lying between said each contour segment and a plurality of points on the line segment by a length of the line segment.

7. The method of claim 6, wherein the plurality of points are equi-distanced from each other.

8. An apparatus for encoding a video signal of a contour of an object, comprising:

means for polygonal-approximating the contour, wherein the contour is divided into a multiplicity of contour segments, and each contour segment is approximated by a line segment joining two end points of the contour segment, thereby determining positions of vertices on the contour;

means for encoding the positions of the vertices on the contour;

means for calculating a set of errors for each contour segment, wherein the set of errors represents a difference between each contour segment and the line segment corresponding thereto;

means for estimating an approximation error between each contour segment and the line segment corresponding thereto;

means for comparing the approximation error with a threshold TH to thereby generate a selection signal when the approximation error is greater than the threshold TH; and means for coding the set of errors in response to the selection signal to provide a set of coded errors.

9. The apparatus of claim 8, wherein said approximation error is a length of the line segment.

10. The apparatus of claim 8, wherein said approximation error corresponds to an area confined by each contour segment and the line segment divided by a length of the line segment.

11. The apparatus of claim 8, wherein said approximation error corresponds to the number of pixels positioned inside each contour segment and the line segment divided by a length of the line segment.

12. The apparatus of claim 8, wherein said approximation error is defined by the distance from the line segment to the farthest point on each contour segment divided by a length of the line segment.

13. The apparatus of claim 8, wherein said approximation error is the sum of the distances from sample points taken on the line segment by a length of the line segment.

14. The apparatus of claim 13, wherein said sample points are equi-distanced from each other.

15. A method for encoding a contour of an object, comprising the steps of:

(a) partitioning the contour into a multiplicity of contour segments by a plurality of vertices, two end points of each contour being vertices:

(b) estimating an approximation error between each contour segment and a line segment join two vertices of each contour segment;

(c) comparing the approximation error with a preset threshold TH;

(d) if an approximation error for a contour segment is greater than the threshold TH, calculating a set of errors between the contour segment and a line segment corresponding thereto; and (e) encoding position information of the vertices and a set of errors for each contour segment having an approximation error greater than the threshold TH, wherein said calculating step (d) includes the steps of:

(d1) determining a predetermined number of sample points on the line segment; and (d2) finding a displacement between each sample point and an intersection formed by said each contour segment and a line normal to the line segment at each sample point.

16. The method according to claim 15, wherein said approximation error is represented by one of a value selected from the group consisting of (a) a length of the line segment, (b) an area between each contour segment and the line segment divided by the length of the line segment, and (c) the number of pixels confined by each contour segment and the line segment divided by the length of the line segment.

17. The method according to claim 15, wherein said approximation error is represented by a maximum distance between each contour segment and the line segment divided by a length of the line segment.

* * * * *